US00H002277H

(19) United States
(12) Statutory Invention Registration
Broad

(10) Reg. No.: US H2277 H
(43) Published: Jul. 2, 2013

(54) MODULAR TOWABLE PLATFORM

(75) Inventor: Adam Raymond Wilson Broad, King George, VA (US)

(73) Assignee: The United States of America, as represented by the Secretary of the Navy, Washington, DC (US)

(21) Appl. No.: 12/932,932

(22) Filed: Mar. 2, 2011

(51) Int. Cl.
*B63B 35/44* (2006.01)

(52) U.S. Cl. ..... 114/264

(58) Field of Classification Search ..... 114/61.1, 114/264, 267, 292, 351, 352, 353, 357
See application file for complete search history.

(56) References Cited

U.S. PATENT DOCUMENTS

| | | | | | |
|---|---|---|---|---|---|
| 3,614,937 | A | * | 10/1971 | Schulman | 114/292 |
| 3,925,991 | A | * | 12/1975 | Poche | 114/267 |
| 5,540,169 | A | * | 7/1996 | Davis et al. | 114/352 |
| 6,164,401 | A | | 12/2000 | Vollmerhausen | 180/119 |
| 6,345,581 | B2 | * | 2/2002 | Blanchard | 114/292 |
| 6,871,607 | B2 | | 3/2005 | Trepanier | 114/61.1 |
| D520,935 | S | | 5/2006 | Schoell | D12/317 |

* cited by examiner

*Primary Examiner*—Daniel Pihulic
(74) *Attorney, Agent, or Firm*—Gerhard W. Thielman; Oscar A. Towler, III

(57) ABSTRACT

A towable buoyant platform of modular floating segments is provided to serve as a floating target. The platform connects at least one pontoon thereto. The pontoon includes a keel that connects to the hull and a plurality of buoyant modules. The keel extends longitudinally along the platform. Each module has an interface that connects to the keel. Each module also includes first and second longitudinal ends. The first and second ends have a tongue and a groove, respectively. The tongue and groove are slideably connectable to each other, such that fore and aft modules of the plurality attach together.

5 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MODULAR TOWABLE PLATFORM

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to a modular towable platform. In particular, the invention relates to pontoon components for assembling the towable platform.

Naval target testing and practice involves disposing a floating object that serves as a target within a navigatable body of water that serves as a firing range. The target can become the recipient of incoming projectiles in order to evaluate targeting equipment and/or augment marksmanship skills. One typical target configuration includes a pontoon boat hull composed of aluminum.

SUMMARY

Conventional towable platforms yield disadvantages addressed by various exemplary embodiments of the present invention. In particular, conventional platforms lack convenient ability to repair and/or sectional replacement of buoyant components that experience damage from kinetic or explosive strikes as a target.

Various exemplary embodiments a modular buoyant platform to serve as a floating target. The platform connects at least one pontoon thereto. The pontoon includes a keel that connects to the hull and a plurality of buoyant modules. The keel extends longitudinally along the platform. Each module has an interface that connects to the keel.

In various exemplary embodiments, each module also includes first and second longitudinal ends. The first end has a tongue, and the second end has a groove. The tongue and groove are slideably connectable to each other, such that fore and aft modules of the plurality attach together.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Conventional aluminum pontoon floatation hulls have been use as targets at Potomac River Test Range for approximately six-to-eight years. During tests in which projectiles strike the hull, portions thereof can be damaged. Such damage can be difficult and expensive to repair. An alternative design (plywood on styrofoam blocks) was considered as a less costly (and disposable substitute) but has been determined to exhibit undesirable characteristics, such as releasing large numbers of small fragments into the local region when struck by a projectile, and thus are not used.

An alternative product from Wilson Distribution of Kenton, Ohio described in U.S. Design Pat. No. D520,935 enables multiple sections to be joined by hinging but does not permit individual replacement when a section is damaged without dismantling the structure from one end.

By contrast, various exemplary embodiments provide a modular towable platform that can serve as a floating target. This platform comprises a frame strut keel on which attach floatable sections that can be removed and retrofitted as necessary.

FIGS. 1A through 1E show elevation views 100 of a pontoon assembly for a towable target platform. In this example, the floating platform represents a hull that includes at least one pontoon to maintain floatation, especially for a structure that bears non-floating loads, such as equipment.

Figure 1A:
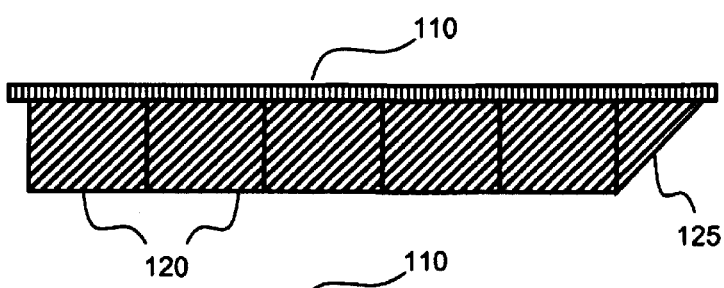
FIGS. 1A-1E are elevation views of a modular pontoon assembly.

In FIG. 1A, the assembly includes an upper spar or keel 110 that extends longitudinally along the hull length of the floating platform. A plurality (in this example, five) of interchangeable floatation sections or modules 120 are suspended from the keel 110 to provide buoyancy along the length of the platform. A bow (and/or alternatively stern) module 125 may optionally be included to reduce drag. These interchangeable modules 120 concatenate to each other by connection interfaces, as well as each module 120 and 125 to the keel 110. The attachment mechanisms for the modules 120 to the keel 110 and to each other can be by bolts or other releasable fastening devices, as will be understood by artisans of ordinary skill.

Figure 1B:
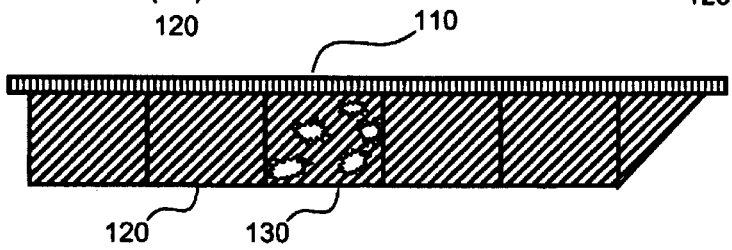
Figure 1C:
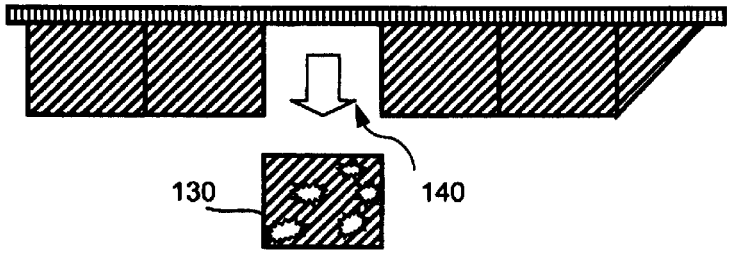

After exposure to attack as a target, at least one exemplary module may become damaged so as to require replacement. In FIG. 1B, the third of five modules 130 indicates physical damage. In FIG. 1C, that damaged module 130 is removed from the keel 110, leaving a gap 140 in the platform.

Figure 1D:
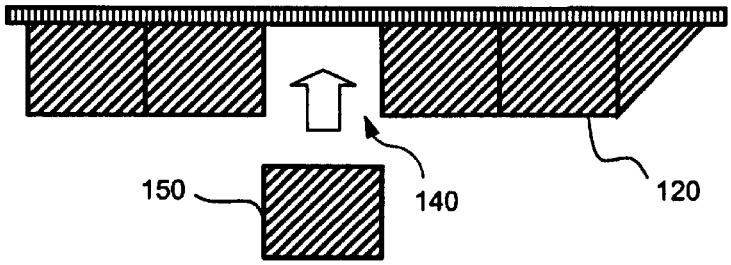
Figure 1E:
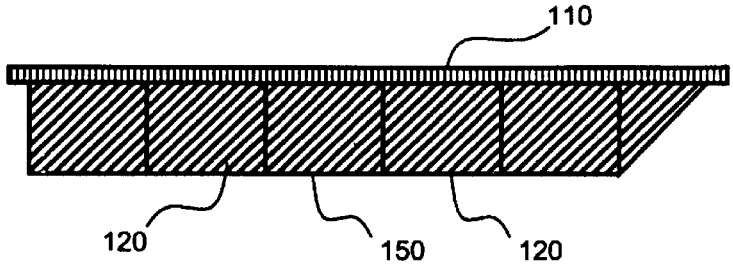

Each module 120 can be designed to maintain buoyancy despite damage, but may require intermittence replacement due to structural demands on the platform. In FIG. 1D, a replacement module 150 inserts into the gap 140. In FIG. 1E, the replacement module 150 has been connected to the keel 110 and the adjacent modules 120, producing a complete and restored platform. Thus, FIGS. 1B through 1E illustrate how a damaged module 130 can be replaced by a replacement module 150 as desired while enabling undamaged sections of interchangeable modules 120 to remain in place.

Figure 2A:
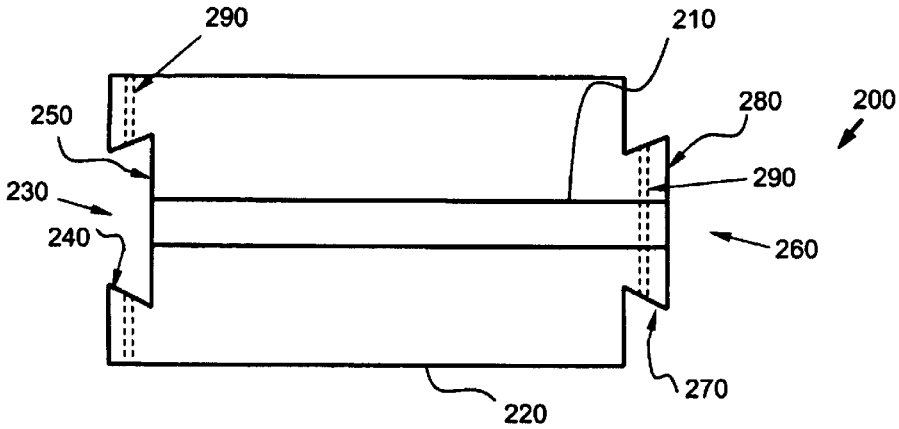
FIG. 2A-2C are elevation and plan views of a modular section.
Figure 2B:
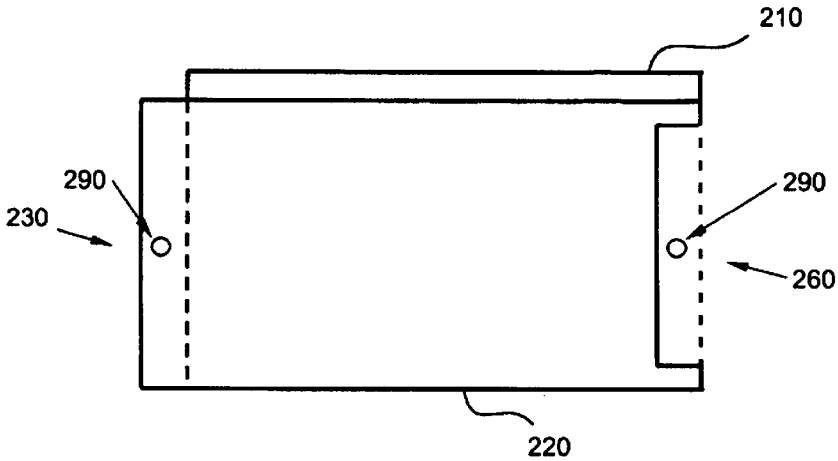
Figure 2C:
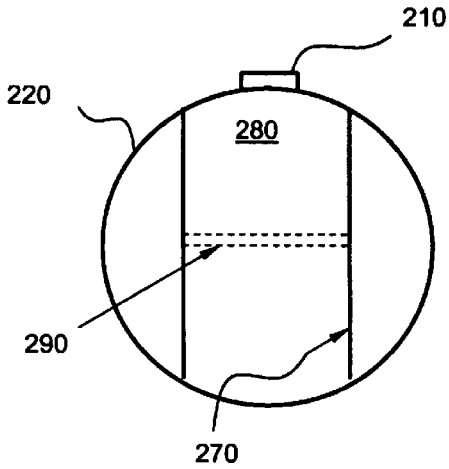

FIGS. 2A, 2B and 2C show plan and elevation views 200 of a pontoon section. In particular, FIG. 2A shows a plan view of the module 120. An upper connection interface 210 inserts into the keel 110 to be secured by fasteners, such as bolts or screws. Below the interface 210, the module 120 includes a floatation body 220 containing hollow or honeycomb compartments to provide buoyancy in water (or other complimentary liquid transport medium). FIGS. 2B and 2C show elevation views 200 from the side and the fore end of module 120, also illustrating the interface 210 and the body 220.

FIGS. 2A and 2B illustrate the body 220, observed along the longitudinal axis of the platform, as including an aft end (at the left) and a fore end (at the right). At the aft and fore ends, the body 220 includes complimentary female and male recepticles. A dovetail arrangement represents the shape of these recepticles. However, artisans of ordinary skill will recognize that alternate slideable connection forms, such as a T-shape-lock-and-key are possible without departing from the scope of the invention.

At the aft end, the female receptacle or groove 230 includes radially expanding edges 240 (to inhibit longitudinal separation) and a facing surface 250. At the fore end, the male receptacle or tongue 260 includes radially expanding surface 270 and a facing surface 280. A through-cavity 290 penetrates both groove 230 and tongue 260 across the entire lateral length of the module 120 to enable insertion of a lock rod that binds one module 120 to another module 150 such as to avoid rotation or slippage.

FIG. 2C shows the body 220 with the fore facing surface 250 and the cavity 290 as observed along the longitudinal direction of the platform. Artisans of ordinary skill will recognize that the slideable orientation of the dovetail or other shape, whether along the lateral or vertical directions substantially perpendicular to the longitudinal axis, represent discretionary options to the designer without departing from the scope of the claims.

Connection between tandem modules can be accomplished via the recepticles. For example, front and rear modules 120 can be connected together by sliding the tongue 260 of the rear module into the groove 230 of the front module such that the respective outward edges 270 and 240 are proximate (in near contact) until the respective surfaces 280 and 270 face each other. A similar arrangement of intersliding faces can also be used with an end module 120 and a bow (or stern) module 125.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A towable hull platform that includes at least one pontoon that connects thereto, said pontoon comprising:

a keel that connects to said hull, said keel extending longitudinally along the platform, and first and second buoyant modules, each module having an interface that connects to said keel, said first module having a first longitudinal end including a tongue, said second module having a second longitudinal end including a groove, wherein said tongue and said groove are slideably connectable to each other, such that fore and aft modules of said plurality attach together.

2. The pontoon according to claim 1, wherein said tongue and said groove form complimentary dovetail interfaces.

3. The pontoon according to claim 2, wherein said tongue and said groove include a cavity that extends laterally through said module for receiving a lock rod.

4. A towable hull platform that includes at least one pontoon that connects thereto, said pontoon comprising:

a keel that connects to said hull, said keel extending longitudinally along the platform, and a plurality of buoyant modules, each module having an interface that connects to said keel, and at least one of first and second longitudinal ends, said first end having a tongue, said second end having a groove, wherein said tongue and said groove are slideably connectable to each other, such that fore and aft modules of said plurality attach together.

5. The pontoon according to claim 4, wherein said each module interchangeable.

* * * * *